(12) United States Patent
Ramamurthy et al.

(10) Patent No.: US 6,606,323 B1
(45) Date of Patent: Aug. 12, 2003

(54) MOBILE MAC PROTOCOL FOR LAN-COUPLED DEVICES INTERCONNECTED BY AN ATM WIDE AREA NETWORK

(75) Inventors: Ram S. Ramamurthy, Manapalan, NJ (US); Radhika R. Roy, Howell, NJ (US); Peter H. Stuntebeck, Little Silver, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/224,469

(22) Filed: Dec. 31, 1998

(51) Int. Cl.[7] .......................... H04L 12/28; H04L 12/66
(52) U.S. Cl. ................... 370/395.53; 370/395.31; 370/401; 370/390
(58) Field of Search .................. 370/328, 338, 370/349, 352, 353, 356, 382, 389, 390, 392, 395.1, 395.2, 395.3, 395.31, 395.53, 400, 401, 409; 709/227

(56) References Cited

U.S. PATENT DOCUMENTS

| | | | |
|---|---|---|---|
| 5,812,552 A | * | 9/1998 | Arora et al. ............ 370/395.53 |
| 6,016,318 A | * | 1/2000 | Tomoike ...................... 370/338 |
| 6,035,405 A | * | 3/2000 | Gage et al. .................. 709/227 |
| 6,041,358 A | * | 3/2000 | Huang et al. ............... 370/331 |
| 6,064,675 A | * | 5/2000 | Alexander et al. .......... 370/397 |
| 6,105,065 A | * | 8/2000 | Rao et al. .................... 709/205 |
| 6,115,385 A | * | 9/2000 | Vig ............................... 370/401 |
| 6,137,799 A | * | 10/2000 | Karapetkov et al. ..... 370/395.2 |
| 6,301,257 B1 | * | 10/2001 | Johnson et al. ............. 370/392 |
| 6,411,625 B1 | * | 6/2002 | Furuhashi et al. ..... 370/395.53 |

OTHER PUBLICATIONS

Patel et al, The Mobile ATM LAN Emulation Protocol, Intel Corporation, 1997 IEEE, pp. 416–420.*

* cited by examiner

*Primary Examiner*—Hassan Kizou
*Assistant Examiner*—Ahmed Elallam (57) ABSTRACT

Enhanced performance of a WAN is achieved by allowing devices to move from LAN to LAN and have the move be transparent to end user applications. This is accomplished by allowing devices to move, with no action being taken in response to a move. Instead, notice is taken of the LANE Emulation Client (LEC) address at which a device can be reached when the device that moved chooses to communicate with some other device. In such a device initiates communication, a table is updated in a LAN Emulation Server (LES), which is an entity maintained by the WAN that interconnects a number of LECs. A similar table is maintained in each LEC, and the table of each LEC is updated whenever a connection is made between one of its devices and some other device. At times, of course, a LEC would have an incorrect address of a sought destination device. In such a case, the LEC sends a query to the LES, and the LES provides what the LES believes to be the correct LEC address. When the LES cannot resolve an address, a message is broadcast to the LES entities of other "emulated LANs," or ELANs, which contains their own LES entities, and those LES entities have an opportunity to provide the correct address.

24 Claims, 10 Drawing Sheets

MOBILE MAC PROTOCOL FOR LAN-COUPLED DEVICES INTERCONNECTED BY AN ATM WIDE AREA NETWORK

TECHNICAL FIELD

This invention relates Asynchronous Transfer Mode (ATM) protocols, and more particularly, to a protocol that enables mobility services for hosts interconnected to an ATM network via Local Area Networks (LANs).

BACKGROUND OF THE INVENTION

Notebook and palmtop computers are becoming very commonplace, and their computing capabilities are continually expanding. It is not surprising, therefore, to find such computers connected to local area networks, and serving as network hosts or as information repositories. Because these computers are easily moveable, the problems associated with mobility of hosts in a LAN are becoming important to solve. This mobility problem is heightened by the fact that, in recent years, the ATM network has emerged as the network of choice for interconnecting a collection of LANs and for providing high throughput and guaranteed quality-of-service (QOS). A standard has been created by the ATM Forum (an industry group), known as "LAN emulation" (LANE), to support existing LAN applications with no modification to inter-LAN communications. Unfortunately, ATM Forum's LANE inter-network protocol does not easily accommodate mobile hosts that are connected to LANs.

More specifically, when a host moves from one place to another, the host looses its identity with respect to its original location and, consequently, complications arise when a host that has the old address of a mobile host attempts to communicate to the mobile host's old address. To overcome this problem, some systems regularly flush all address-caches and, after flushing, resolve the addresses for all hosts anew. The LANE protocol does not provide mechanisms for performing address cache flushing selectively, such as only for the mobile hosts.

The situation becomes more burdensome when communication needs to be established among the LAN-based mobile hosts when these hosts change their locations frequently.

SUMMARY OF THE INVENTION

We realized that it would be advantageous to create a mechanism that, while conforms to the LANE standard, efficiently follows mobile hosts and is transparent to end user applications. This is accomplished by allowing devices to move at will from LAN to LAN, with no action being taken in response to a move. Rather, notice is taken of the LANE Emulation Client (LEC) address at which a device can be reached when the device that moved chooses to communicate with some other device. In such a case, a table is updated in a LAN Emulation Server (LES), which is an entity maintained by the WAN that interconnects a number of LECs. A similar table is maintained in each LEC, and the table of each LEC is updated whenever a connection is made between one of its devices and some other device. At times, of course, a LEC would have an incorrect address of a sought destination device. In such a case, the LEC sends a query to the LES, and the LES provides what the LES believes to be the correct LEC address. When the LES-provided address proves to be incorrect (or the LES does not have an address), a message is broadcast to the LES entities of other "emulated LANs," or ELANs, which contains their own LES entities, and those LES entities have an opportunity to provide the correct address.

In one embodiment, the concept of each device having a "home LEC" is included, which would allow the network to provide enhanced levels of service to devices in their home LECs, as compared to the levels of service outside the home LECs.

DETAILED DESCRIPTION

Figure 1:
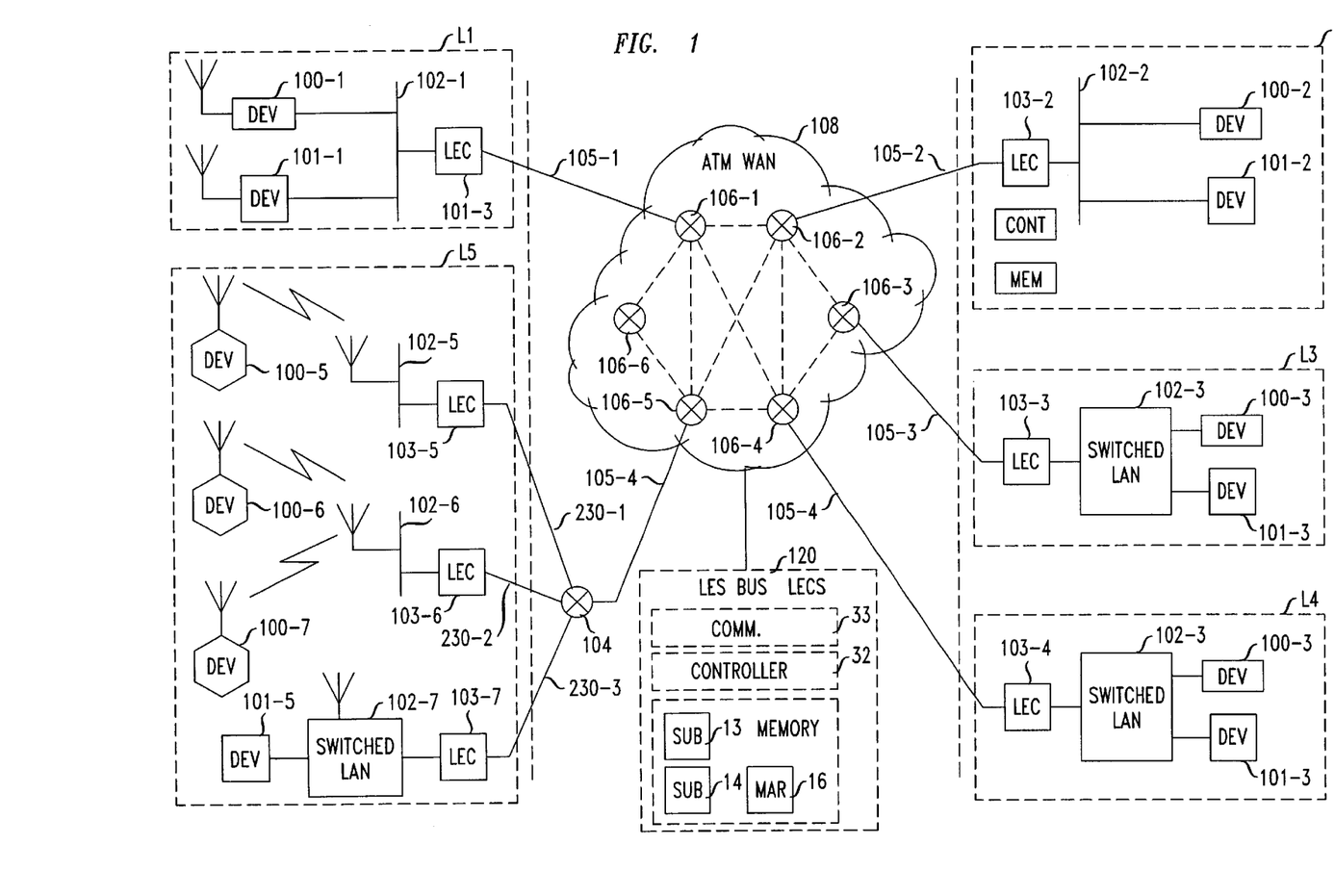
FIG. 1 illustrates a possible arrangement that involves an ATM wide area network that interconnects a plurality of LAN Emulation Clients, each of which supports a plurality of devices connected to a LAN.

FIG. 1 depicts an arrangement where hosts that are coupled to local area networks (LANs) can communicate with each other via an ATM network. Illustratively, FIG. 1 includes a plurality of locations, L1, L2, L3, L4, and L5, which are coupled to wide area ATM network 108. Each location includes at least one LAN, and each LAN has one or more devices coupled to the LAN. A LAN Emulation Client (LEC) is interposed between each LAN and network 108. Mobile device, such as lap-top computes, are designated by the label 100-i; the relatively stationary devices, such as PC servers or printers, are designated by the label 101-i; LANs or switched LANs are designated by label 102-i, and the LECs are designated by the label 103-i: Aside from the fact that the different depicted LANs are in different physical locations, it may be noted that the LANs in locations L1 and L2 are shared, whereas the LANs in locations L3 and L4 are switched. Location L5 has three LANs, with two being of the shared type and one being of the switched type, and those LANs are coupled to network 108 through switch 104. It may also be noted that device 101-5 in location L5 and all of the devices in locations L1–L4 are coupled to a LAN by means of a wired connection. Devices 100-5, 100-6 and 100-7 are coupled to a LAN by means of a wireless connection. Thus, while host 100-1, for example, is mobile, wireless host 100-5 is potentially even more mobile, being connectable to LANs 102-5, 102-6 or 102-7 simply by moving from place to place in the same location (e.g., building floor).

The LECs are conventional elements (e.g., ATM bridge, ATM router) that operate in accordance with ATM Forum's LANE standard. A more detailed description of what the LECs do in connection with the invention disclosed herein is found below.

Conventionally, devices are connected to a LAN through interface cards. Each LAN interface card has a unique Medium Access Control (MAC) address, and that makes the combination of the LAN interface card and the device within which it is placed uniquely addressable. Consequently, all devices that are connected to the FIG. 1 LANs (e.g., computers that serve as hosts, servers, computers that serve as clients, intelligent memories, printers, etc.) have a unique MAC address, as does the LEC. The LEC also has an ATM address that is related to its connection to the ATM network.

One function of the LANE protocol is to map MAC addresses into ATM addresses. The goal is to perform these address mappings so that a LEC can set up direct connections between a device on its LAN, and a device on a LAN coupled to another LEC, achieving thereby an effective path for exchange of data. Such set-up of connections is performed with the aid of one or more entities within the ATM network, as described below.

Administratively, ATM network 108 is divided into domains, and each domain has LAN Emulation Configuration Server (LECS). The LECS is an entity, implemented with hardware and software, which effectively creates one or more super (logical) local area network, which the ATM Forum dubbed "emulated LAN," or ELAN. A LECS can reside in an apparatus that is coupled to some of the ATM switches of network 108. A LECS can also reside in the hardware of one of the ATM switches. Each of the ELANs comprises a number of LAN emulation clients (LEC), a LAN emulation server (LES), and a "broadcast and unknown server" (BUS).

The LES implements the control functions for its ELAN, and it can be implemented in any hardware connected to one of the ATM switches of network 108, or within the hardware of some ATM switch.

The BUS is a server that is used to query other LES entities about a particular MAC address, as described in more detail below. The BUS, like the LES, can be implemented in any hardware connected to a switch in the ATM network, or within the hardware of some ATM switch.

Illustratively, the LECS, the LES, and the BUS functions are implemented in FIG. 1 in a single distinct apparatus 120 that is coupled to an ATM switch of network 108.

The LEC performs data forwarding, address resolution, and other control functions. It is the interface between the ATM network where ATM addresses are used, and the LAN, where MAC addresses are used. Thus, each LEC has an associated ATM address by which it can be reached by the LES, and a unique MAC address by which is can be reached by devices coupled to the LAN. The LEC maintains a table that associates the MAC addresses of hosts and other devices with the LEC (for convenience, this table is referred to as the Devices Table). At a minimum, this table has a single column of MAC addresses, and it allows the ATM network to ascertain which MAC addresses can be reached at the LAN associated with the LEC. The LEC also maintains a table that associates the MAC addresses of devices that are reachable at LANs of other LECs that are connected to network 108. At a minimum, this table (for convenience, named the MAC address-ATM address Reach Table, or MAR, Table) has one column with MAC addresses, and another column with ATM addresses of remote LECs with which the MAC addresses are associated. An entry in this table effectively states "you can find a device having this MAC address at a LEC having that ATM address". It is a binding between a MAC address and a LEC ATM address.

The LES also maintains a MAR Table that associates MAC addresses with ATM addresses of LECs with which the corresponding MAC addresses are associated.

Figure 2:
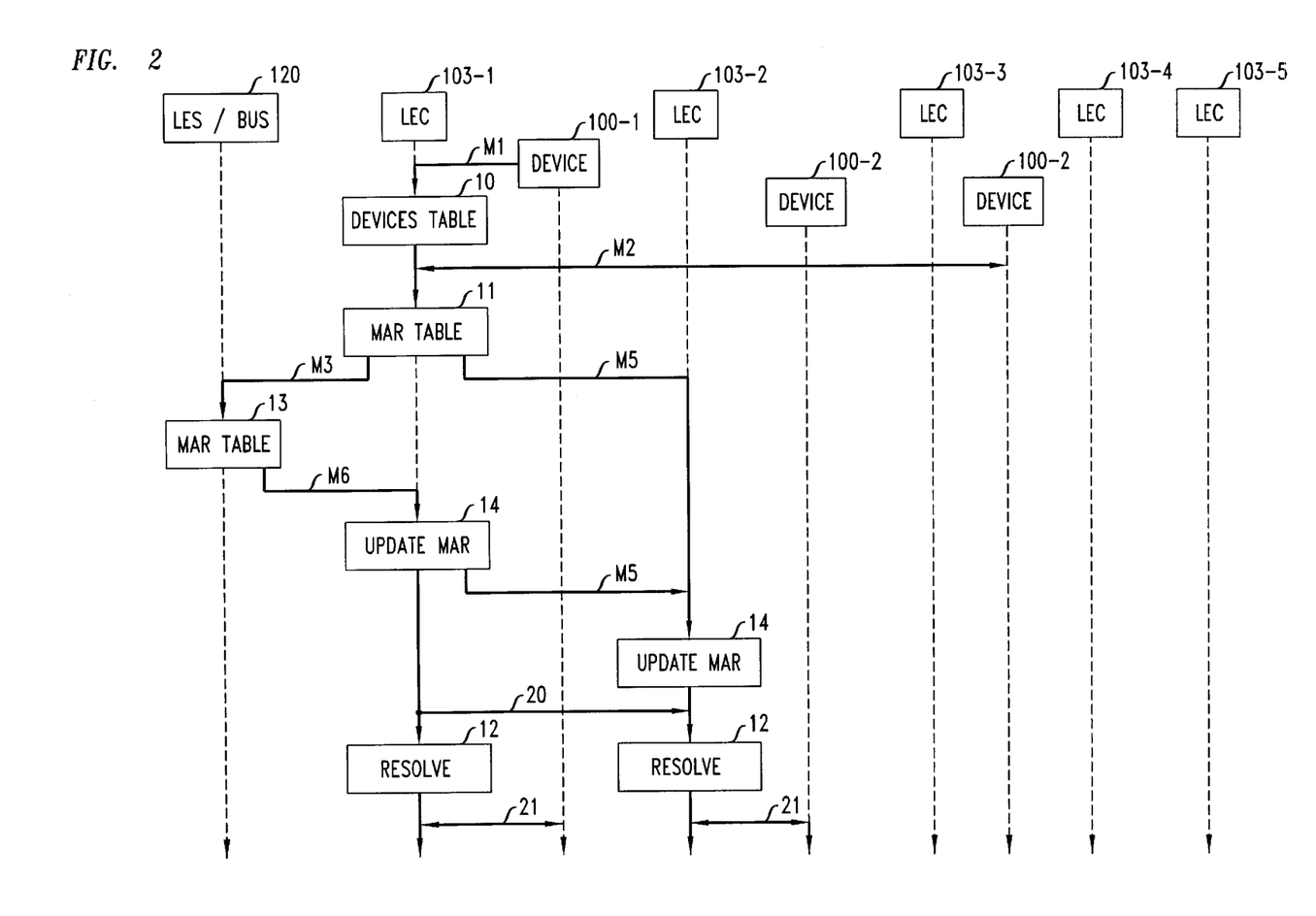
FIG. 2 presents a protocol that is carried out when the location of a destination device is correctly known by a MAC Address—ATM Address Reach (MAR) table.

Conventional Operation—FIG. 2

Conventionally, all devices register themselves with the LES, so the LES knows the whereabouts of all devices. The flow of conventional operation, based on the above-described entities is, therefore, as depicted in FIG. 2. When a device on a LAN wishes to initiate communication with another device (e.g., another host, a printer, etc.), it sends a message M1 to its LAN, specifying its own MAC address and the MAC address of the destination device. For example, device 100-1 sends message M1 to LAN 102-1, specifying its MAC address and the MAC address of its sought destination, e.g., device 101-1. The LEC comprises a stored-program-controlled processor that, through execution of various subroutines, can receive data, send data, process data, etc. It is noted that apparatus that includes a controller that executes subroutines typically stores those subroutines in a memory. Accordingly, FIG. 1 illustratively depicts a controller and a memory in LEC 103-2. The other LECs have similar components that, for sake of clarity of the drawing, are not shown. Thus, message MI is received in LEC 103-1 and subroutine 10 in LEC 103-1 ascertains whether the sought MAC address is found on its Devices Table. When that is the case, subroutine 10 concludes that the sought device is coupled to LAN 102-1. It, therefore, takes no action since the communication is carried out within the LAN, and communication takes place as shown via line 200. The protocol involved in the process of communication is in accordance with IEEE's LAN protocol standards, and not part of this invention. It is noted that subroutine 10, which operates on a devices table is depicted in FIG. 2 by a block marked by that on which the subroutine operates. Likewise with respect to other blocks in FIG. 2 and subsequent FIGs. the different subroutines are distinguished in their drawing labels by that on which the subroutines operate.

When subroutine 10 does not find device 100-2 in its Devices Table (for example, when device 100-1 wants to communicate with device 100-2), as is the situation in this example, control passes to subroutine 11 where the LEC ascertains from its MAR Table whether an entry that corresponds to the sought MAC address is found therein. Such an entry identifies the ATM address of the LEC that is coupled to the LAN to which device 100-2 is coupled. When such an entry is found, LEC 103-1 sends a message M5 to the LEC of the sought device, here, LEC 103-2. Message M5 informs LEC 103-2 to condition itself for communication between one of its devices (here, device 100-2) and a device coupled via the ATM WAN. This communications scheme is a part of ATM Forum's LANE standard, and is not a part of this invention.

If the MAR Table of LEC 103-1 does not contain the needed information, LEC 103-1 sends a control message M3 to the LES. Subroutine 13 in the LES searches through the MAR Table of the LES and, since in the conventional situation all devices are registered with the LES, the search through the LES MAR Table is successful and the needed information is sent to the requesting LEC 103-1 via message M6. Subroutine 14 associated with LEC 103-1 updates the MAR Table of LEC 103-2 with the received information. Then, LEC 103-1 starts sending messages M5 to LEC 103-2. Subroutine 14 that is associated with LEC 103-2 is also charged with updating the MAR table of its LEC, but in the scenario presented here, it may be assumed that LEC 103-2 has correct information about the whereabouts of device 100-1 and, therefore, no updating takes place. Control then passes to address resolution subroutines 12 in LEC 103-1 and 103-2, respectively, which, via line 20, proceed to establish and carry on communication. Thereafter, the communication occurs between devices 100-1 and 100-2 via LECs 103-2 and 103-2 as shown by lines 21, 20, and 21. This scheme is also a part of the ATM . Forum's LANE standard.

LES 120, being a distinct apparatus that maintains a MAR table, that receives messages, executes subroutines such as subroutines 13 and 14, and sends messages, illustratively comprises a memory, a stored program controller and communication modules. This is illustrated in FIG. 1 with memory 31 that stores subroutines 13 and 14, as well as a MAR table 16, a controller 32, and a communication module 33.

The above-described operation works well when devices are registered with the LES, and where the devices don't move from LAN to LAN without having the LECs and the LES MAR Tables properly updated. A problem arises, however, when such devices do move from LAN to LAN, because the information in the MAR Table of the LES and the MAR Tables of the various LECs becomes incorrect and, as indicated above, no convenient and fast mechanism presently exists for correcting this information. The following overcomes this problem.

In accordance with the principles disclosed herein, global data checking and modification are not conducted at regular intervals but, instead, data acquisitions and database modifications are undertaken only when the data is needed. This substantially reduces the administration burden that would otherwise be imposed. Also in consequence of this principle, when a device leaves a LAN (its home LAN, or a known visited LAN) no action is triggered. Similarly, when a device connects to a LAN no action is triggered. Since no action is triggered when a device is turned off, is disconnected from a LAN, or is turned on, connected, or reconnected at another LAN, none of the FIG. 1 entities know when a device is inaccessible. Eventually, however, interactions with a device that moved from one LAN to another will be desired and, at that time, information must be gathered regarding the whereabouts of a device that left its known LAN and connected itself to another LAN.

The following table lists a number of scenarios that are discussed below:

| Scenario | Circumstance |
| --- | --- |
| 1 | Device 100-1 initially connects to LAN 102-1, and initiates communications with device 101-1 and 100-2. |
| 2 | Device 100-1 initially connects to LAN 102-1 and, thereafter, device 100-3 wishes to communicate with device 100-1. |
| 3 | Device 100-1 initially connects to LAN 102-1, communicates with device 100-2 and, terminates the communication. Thereafter, device 100-3 wishes to communicate with device 100-1. |
| 4 | Having been connected to LAN 102-1 and communicating through it, device 100-1 moves from LAN 102-1 to LAN 102-2, and initiates communications to device 100-3. |
| 5 | Following a scenario 4 circumstance, device 100-4 wishes to communicate with device 100-1. |
| 6 | Device 100-1 moves from LAN 102-1 to LAN 102-2 and, thereafter, device 100-4 wishes to communicate with device 100-1. |

Figure 3:
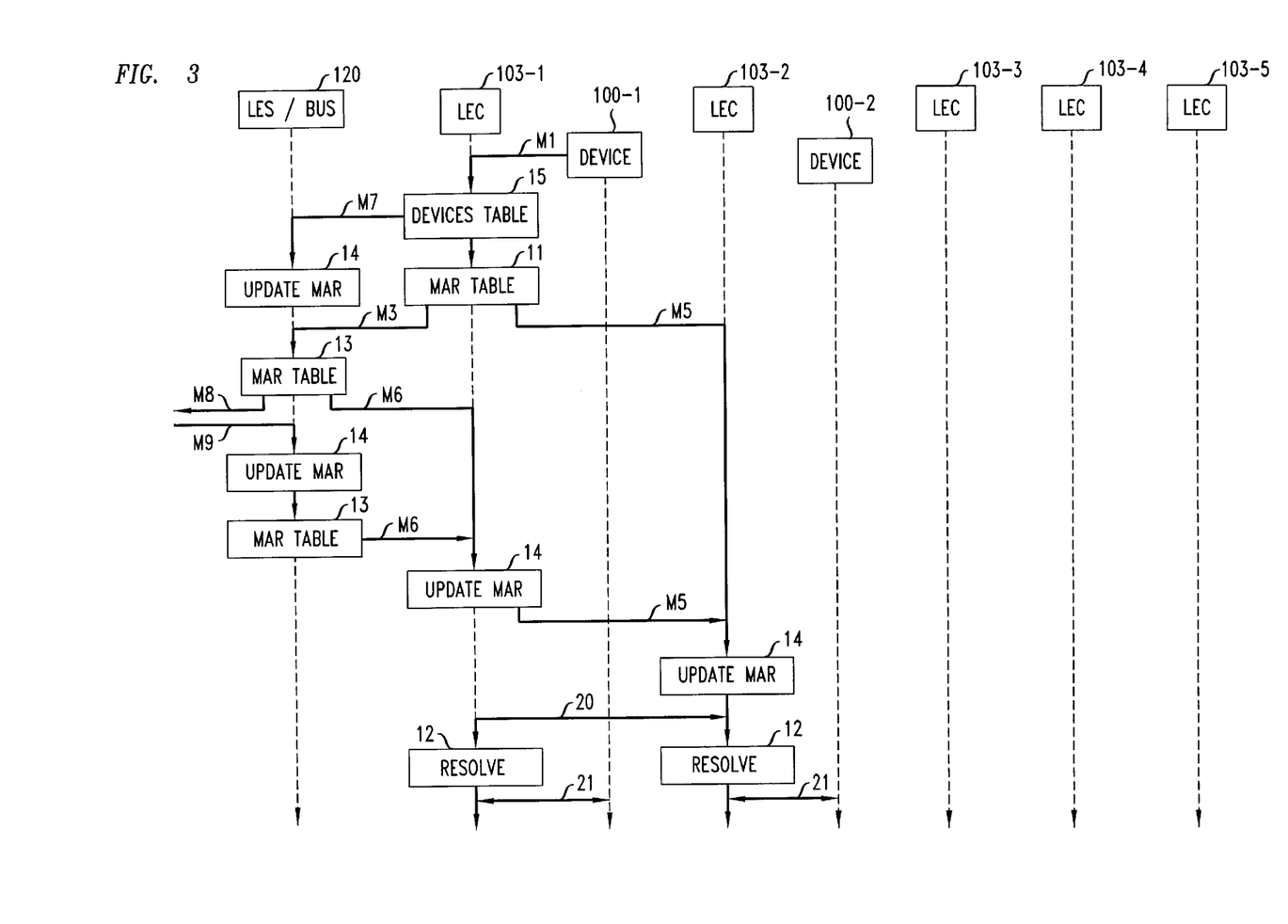
FIG. 3 presents a protocol, in accordance with the present disclosure, when a device first connects to a LAN of a LEC, and initiates communication.

Scenario 1—FIG. 3

In this scenario, device 100-1 makes its initial connection to the network, and it happens to connect to LAN 102-1. The act of connection triggers no activity. Activity does commence when device 100-1 wishes to communicate to another device, illustratively, to device 100-2. Device 100-1 initiates communication to device 100-2 by sending message MI to LEC 103-1, specifying its own MAC address (source address) and the MAC address (destination address) of device 100-2. Control passes to subroutine 15 in LEC 103-1, which is similar to subroutine 10, in that it checks to determine whether the destination device is found in the LEC's Devices Table. It differs from subroutine 10 in that it also ascertains whether the source address is found in its Devices table. In this case, device 100-1 is not found in the Devices table, revealing to LEC 103-1 that device 100-1 is new to LAN 102-1. This revelation causes subroutine 15 of LEC 103-1 to enter the MAC address of device 100-1 in its LEC Devices Table and to send a control message M7 to the LES. Message M7 informs the latter of the binding between the MAC address of device 100-1 and the ATM address of LEC 103-1. Subroutine 14 within the LES updates the LES's MAR Table.

Thereafter, subroutine 15 ascertains whether the destination address (i.e., that of device 100-2) is found in the Devices table. Then, control passes to subroutine 11 which, as before, ascertains whether the destination address is found in the MAR Table. When such an entry is found, LEC 103-1 sends out a control message MS to LEC 103-2. The control message MS contains the information about the logical binding between device 100-1 and LEC 103-1, allowing update subroutine 14 in LEC 103-2 to update its MAR table. Through line 20, address resolution subroutines 12 and lines 21 communication is established.

If the MAR Table of LEC 103-1 does not contain the needed information, LEC 103-1 sends the control message M3 to the LES. Subroutine 13 in the LES peruses its MAR Table, and if it finds the needed information, it provides the information to the requesting LEC 103-1 via the control message M6. Subroutine 14 installs the received information into the LEC 103-1 MAR Table, and communication proceeds as described above after address resolution subroutines 12, and lines 20 and 21.

If subroutine 13 in the LES finds that its MAR Table does not contain the needed information, the BUS broadcasts a query message M8 to the LES entities of other ELANs to identify the LEC with which the sought MAC address is associated in accordance with ATM Forum's ELAN standard. When a LES from another ELAN responds via message M9, subroutine 14 in the LES of device 100-1 updates its MAR Table. Thereafter, subroutine 13 is re-executed, sending message M6 to LEC 103-1. Subroutine 14 within LEC 103-1 updates the MAR table of LEC 103-1, and the process continues as described above.

Figure 4:
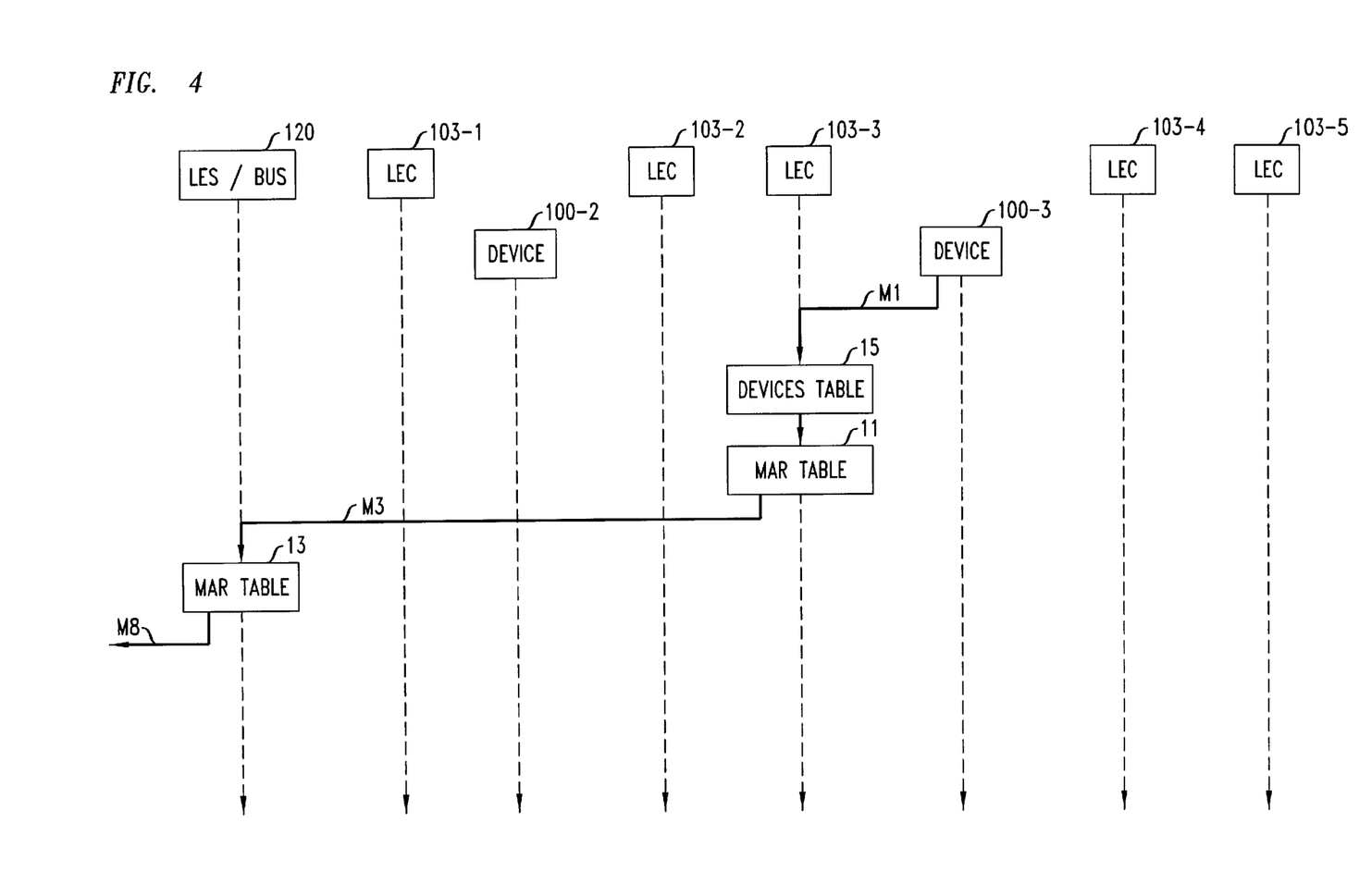
FIGS. 4 and 5 present a protocol where a device merely connects to a LAN, and then some other device wishes to communicate with the device.
Figure 5:
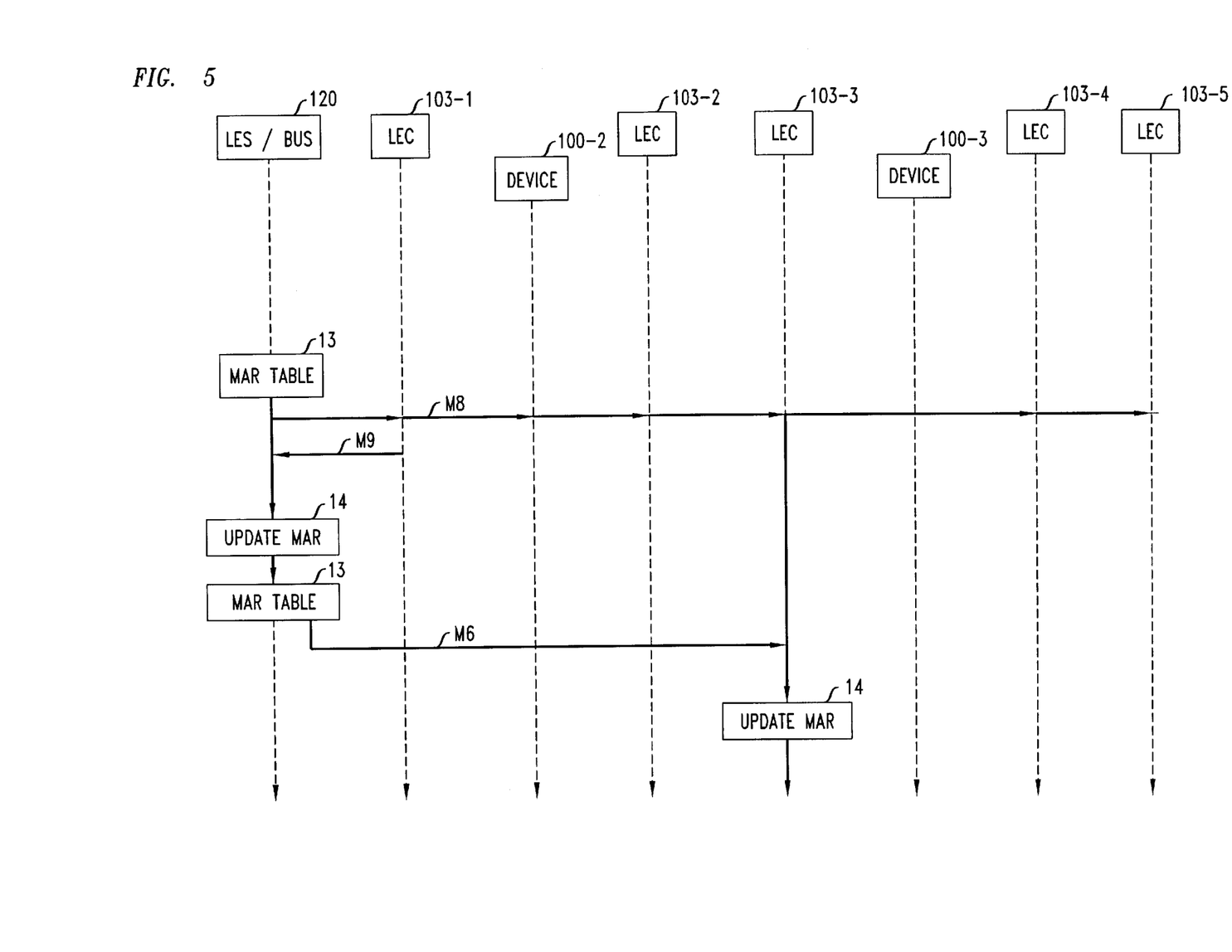

Scenario 2—FIG. 4 and FIG. 5

In this scenario, device 100-1 connects to LAN 102-1. There can be three possible situations: 1. Device 100-1 connect to LAN 102-1, but is inactive; 2. Device 100-1 has been active, and a logical binding has already been established between its MAC address and the ATM address of LEC 103-1, and LES 120 has been updated with this address binding; and 3. Device 100-1 has been active and a logical binding has already been established between its MAC address and the ATM address of LEC 103-1, but this address binding is yet to be updated with LES 120 by LEC 103-1.

In situation 1, no communication can be established since the whereabouts of device 100-1 is not known to anyone. This is the classical situation of the IEEE's LAN protocol, and this invention does not intend to change this situation by imposing any other control or communication mechanisms.

In situation 2, the MAC address of device 100-1 is cached in the device table of the LEC as soon as device 100-1 starts communicating in LAN 102-1. Because the message transmitted by device 100-1 will contain its MAC address in addition to the information payload, LEC 103-1 connected to LAN 102-1 will also be able to listen to this message. The same MAC address is binded to the LES MAR table by LEC 103-1 in accordance with the LANE protocol. The same communication mechanism that has been described in scenario 1 holds true in the case of communications between devices 100-1 and 100-2. The only difference is that the initiation of communication will be made by device 100-2 instead of device 100-1.

In situation 3, LES 120 does not know the MAC-ATM address binding of device 100-1. The following described this communication scenario.

According to the protocol already described in connection with scenario 1, device 100-3 starts sending the message M1 as usual, as shown in FIG. 4. This message is received by LEC 103-3, and subroutine 15 of LEC 103-3 finds device 100-3 in its LEC Devices Table and does not find device 100-1 in its Devices Table. Continuing, subroutine 11 of LEC 103-3 also finds that its MAR Table does not have an entry for device 100-1 so it sends out message M3 to the LES, querying the LES for information about device 100-1.

Alas, the LES has no information about device 100-1, so the BUS broadcasts message M8 to LES entities of other ELANS for the whereabouts of device 100-1 in accordance with ATM Forum's ELAN standard. However, in this scenario, no other LES knows the whereabouts of device 100-1 and, therefore, in the current environment, the connection request fails.

The LES receives message M3 and find that it has no entry in its MAR Table that corresponds to the sought device. It then broadcasts message M8 to its LECs. See FIG. 5.

In scenario 2, the M10 message that is sent by LEC 103-1 does trigger a response message M11, and consequently, LEC 103-1 generates message M9 and forwards it to the LES.

Each LEC that receives message M8 compares its MAR table whether to determine whether the MAC-ATM binding can be resolved. If device 100-1 happens to be connected to the LAN and the corresponding LEC has the MAC-ATM address binding, the LEC generates the message M9 and sends it to its LES. That is, the LES gets a message M9 response only from the LEC that has device 100-1 connected to its LAN, and response from all other LECs.

This communication scenario is in accordance with the LANE protocol.

When the LES shown in FIG. 5 receives message M9, it updates its MAR Table with its subroutine 14 and re-executes subroutine 13 to cause message M6 to be sent to LEC 103-3. Subroutine 14 in LEC 103-3 updates its MAR Table, and the process continues as described above. Of course, when a message M9 never arrives, the connection attempt fails after a certain timeout.

Figure 6:
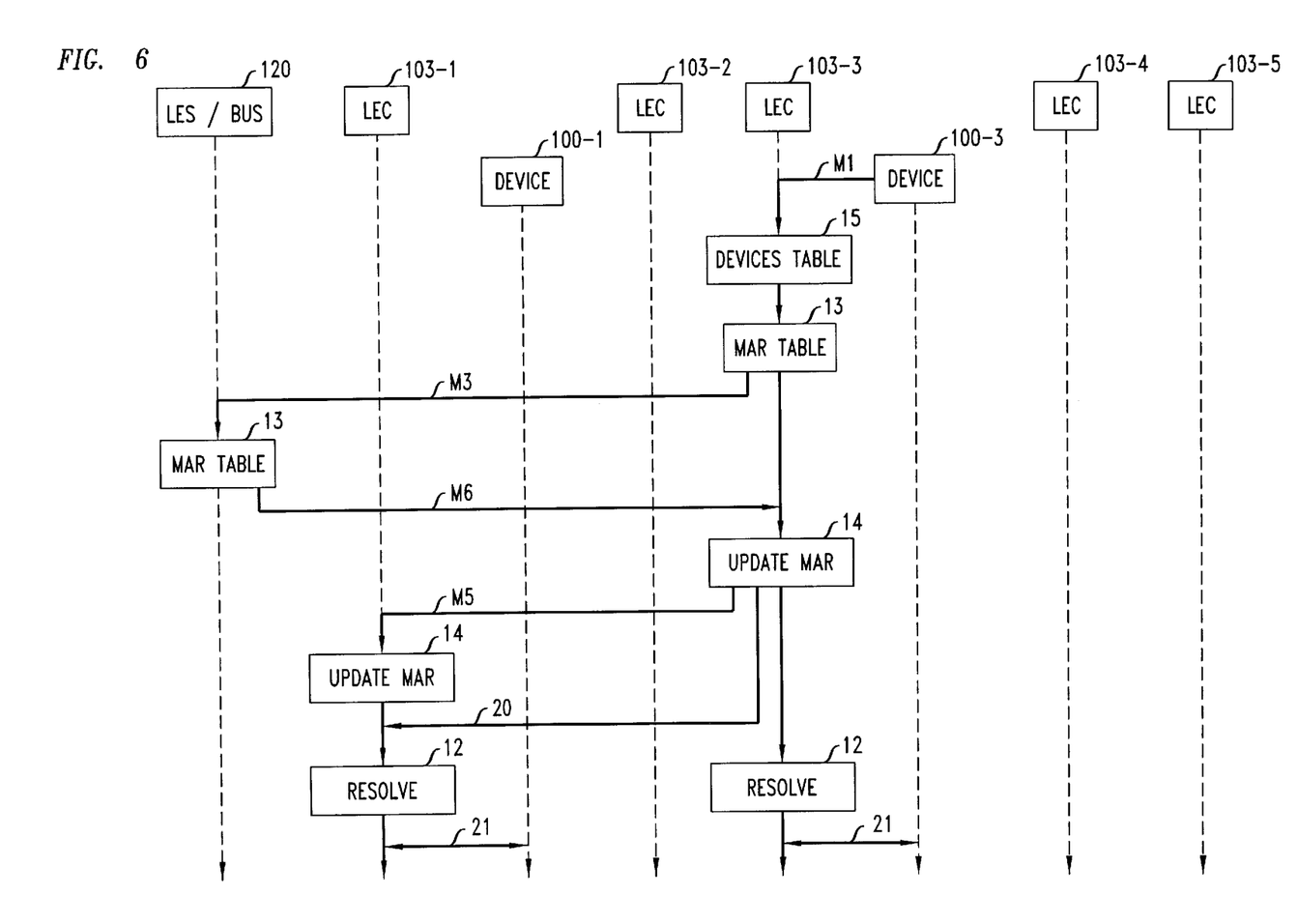
FIG. 6 presents a protocol where a device connects to a LAN, initiates some communication and, thereby, becomes known to the LES, and then some other device wishes to communicate with the device.

Scenario 3—FIG. 6

In this scenario, device 100-1 connects to LAN 102-1 and establishes communication with device 100-2 (in LAN 102-2). This portion corresponds to scenario 1 and, therefore at this point, LEC 103- 1, the LES, and LEC 103-2 know the correct whereabouts of device 100-1.

When, after terminating this communication, device 100-3 wishes to establish communication with device 100-1, it launches message M1. This message is received by LEC 103-3, and subroutine 15 determines that the source address is found in its Devices table and the destination address is not found in the Devices Table. Control passes to subroutine 11, which determines that the MAR Table of LEC 103-3 does not have an entry for device 100-1. Accordingly, message M3 is sent to the LES but, unlike in scenario 2, the LES does find an entry for device 100-1 in its MAR table, and so informs LEC 103-3 by message M6. This entry, which is sent to LEC 103-3 via message M6 and which associates the ATM address of LEC 103-1 with the ATM address of device 100-1, is installed in the MAR Table of LEC 103-3 by subroutine 14. Thereafter, the communication is established between the devices as shown in lines 20 and 21 pursuant to address resolution subroutine. This mechanism of communication is also a part o the LANE protocol.

Figure 7:
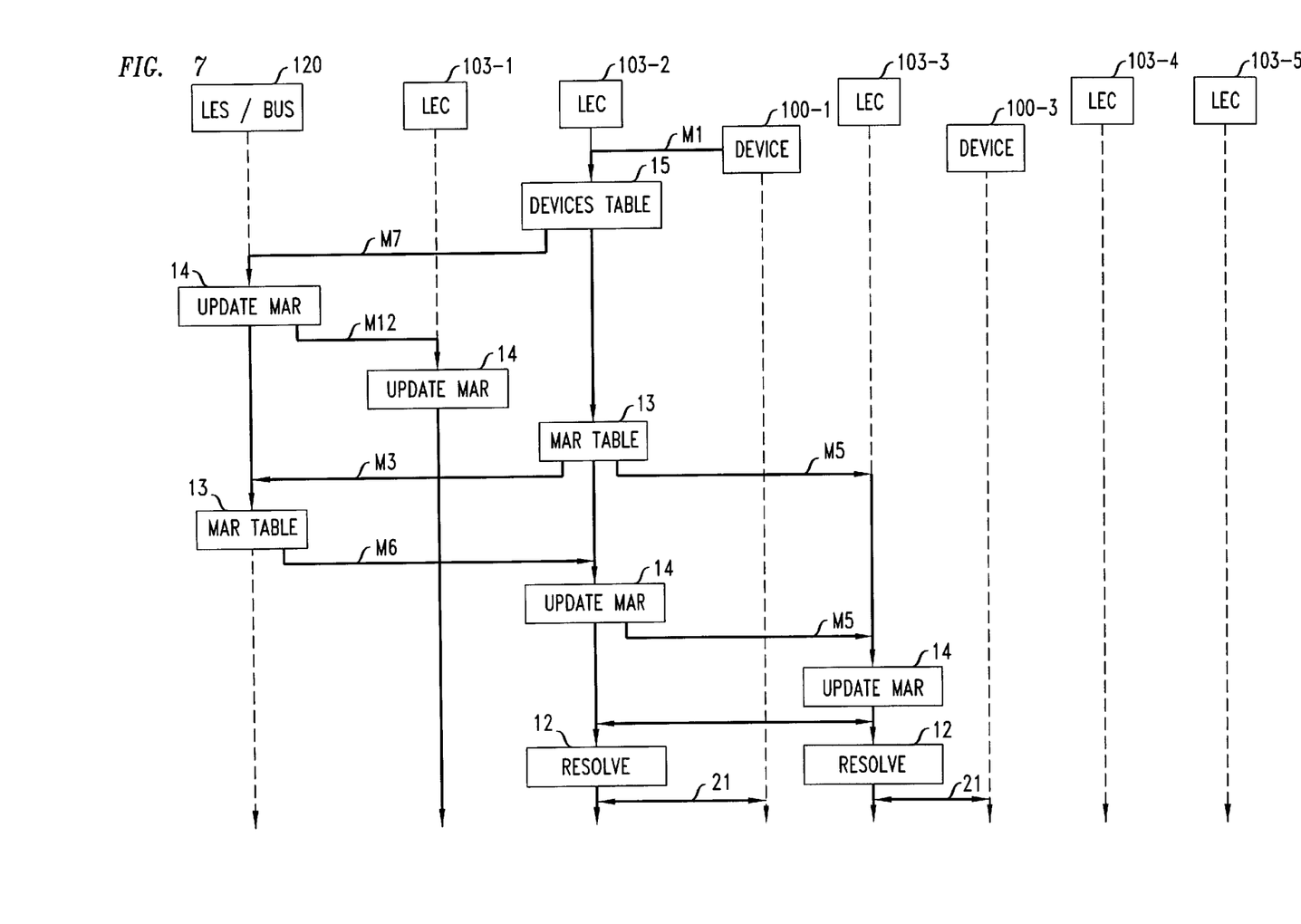
FIG. 7 presents a protocol where a device moves from one LAN to another LAN and then initiates communication.

Scenario 4—FIG. 7

Having been connected to LAN 102-1 and communicating through it, device 100-1 moves from LAN 102-1 to LAN 102-2, and initiates communications to device 100-3. In this scenario, device 100-1 moves from LAN 102-1 to LAN 102-2 after having communicated through LAN 102-1. At the time of connection to LAN 102-2, device 100-1 is known to be associated with LEC 102-1 by at least some entities. Specifically, this knowledge is possessed at least by LEC 103-2 and by the LES.

In this scenario, as demonstrated below there are four entities that are involved, and none of them have the correct information about the whereabouts of device 100-1:

LEC 103-2, which is the new source LEC in the desired connection;

LEC 103-3,.which is the destination LEC in the desired connection;

LEC 103-1, which is the old LEC of device 100-1; and the LES.

When device 100-1 launches message M1 destined to device 100-3, LEC 103-2 receives the message, and subroutine 15 peruses through its Devices Table. This perusal reveals that the source address in message M1 belongs to a device that is not known to LEC 103-2. Accordingly, subroutine 15 updates the Devices Table of LEC 103-2 and sends message M7 to the LES.

Subroutine 14 in the LES updates its MAR. Unlike the situation in scenario 1, subroutine 14 finds that the MAR Table already has an entry for device 100-1, and that entry indicates that device 100-1 is associated with LEC 103-1. The LES concludes that device 100-1 moved and, therefore, in addition to updating its MAR Table, the LES and sends a message M12 to LEC 103-1. In response to message M12, subroutine 14 in LEC 103-1 updates its MAR Table and the Devices Table. Updating of the Devices Table takes the form of deleting the device 100-1 entry. Updating of the MAR table in subroutine 14 takes the form of replacing the existing entry for device 100-1 in LEC 103-1, if any, with the new binding information.

It is very important to note that at the time of subscription to service any device can declare that a certain LNA is its home network, and the corresponding LEC becomes its home LEC. This information of the home LEC of a given device can be kept in the MAR table of the LES. Therefore, the MAR address table is updates as a device moves one network to another network, but the information about the home LEC of a given device remains unchanged. As a result, a LES can always determine whether a device is in its home network or not. This is one of the most important properties of this invention. A differentiation of services can be provided through knowing whether a device is located in its home network or not, when needed. For example, device 100-1 can declare that LAN 102-1 is its home network and the corresponding LEC 103-1 as its home LEC. LES 120 will update its MAR table device 100-1 moves to LAN 102-2, but it will keep the home LEC 103-1 information in its MAR table as the home. LEC of device 100-1.

Subroutine 15 of LEC 103-2 also discovers that the destination device is not found in the Devices Table, so control passes to subroutine 11, which peruses the MAR table of LEC 103-2. If an entry is found for destination device 100-3, then message M5 is sent. Otherwise, message M3 is sent to the LES, the LES returns an entry for destination device 100-3 via message M6, the MAR Table of LEC 103-2 is updated, then message M5 is sent, and the MAR Table of LEC 103-3 is updated. As before, address resolution subroutines 12 of LECs 103-2 and 103-3, and lines 20 and 21, participate in the communication.

Thus, at the end of scenario 4, the correct binding for device 100-1 is found in the LES, in LEC 103-1, in LEC 103-2, and in LEC 103-3. This mechanism of resolving addresses, establishment of communication, and protocols are the fundamental basis of this invention.

Figure 8:
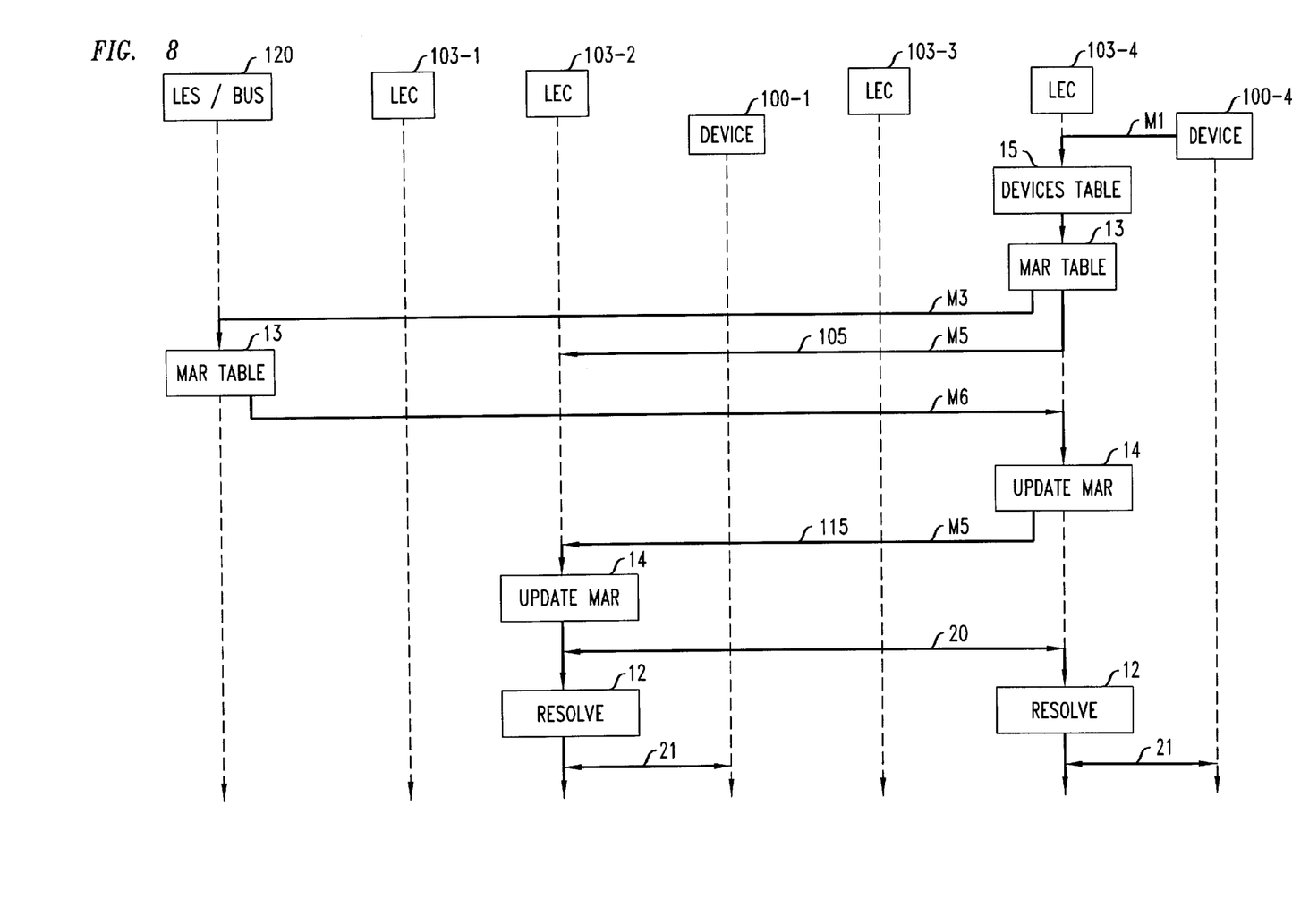
FIGS. 8 and 9 present a protocol where some device wishes to communicate with a device that moved from one LAN to another LAN and became known to the LES.
Figure 9:
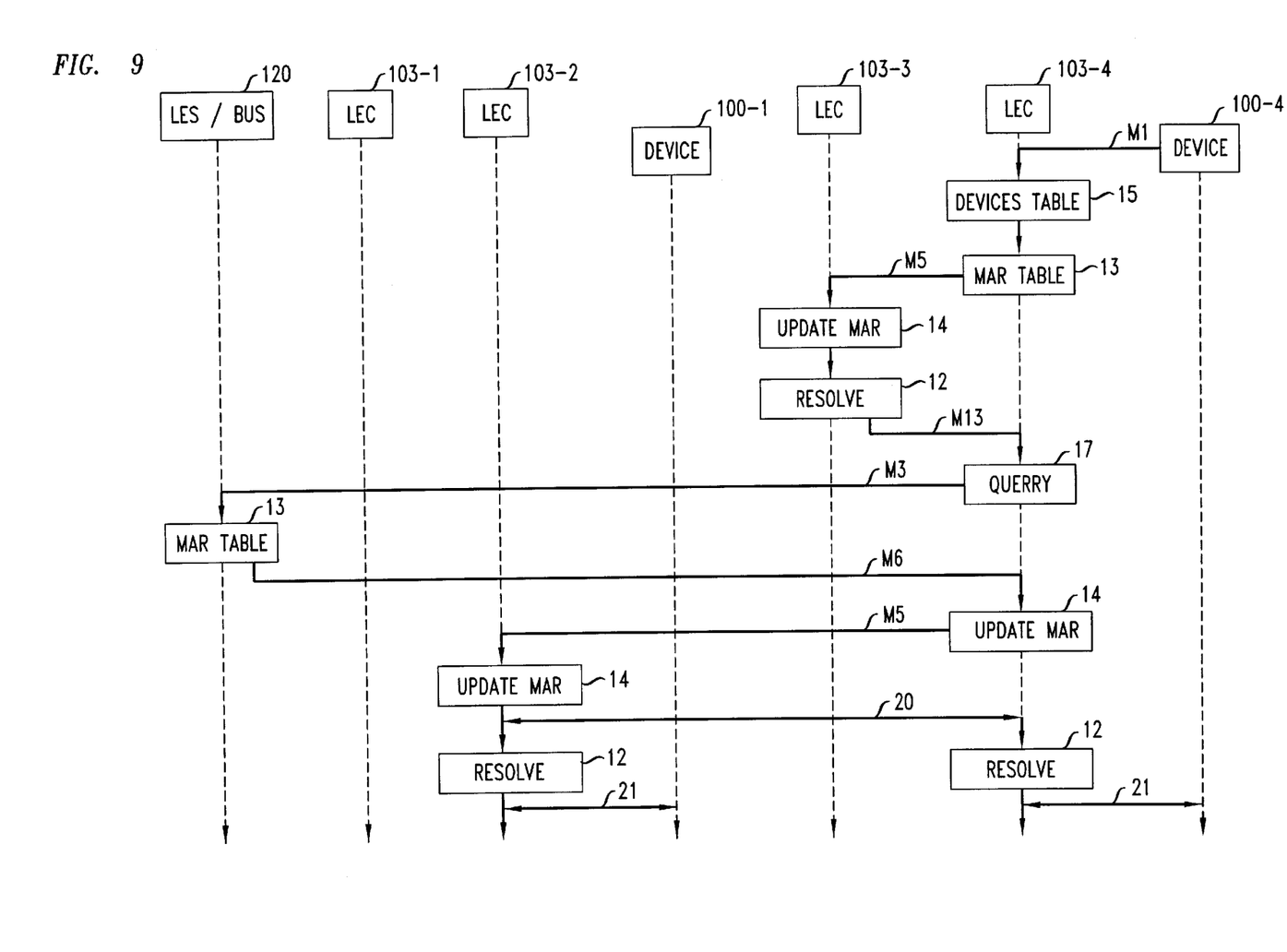

Scenario 5—FIG. 8 and FIG. 9

According to this scenario, device 100-4 wishes to be connected to device 100-1 following a scenario 4 activity. As in other scenarios, device 100-4 launches a message M1. LEC 103-4 receives the message and passes control to subroutine 15. Subroutine 15 determines that device 100-4 is found in the device table, and 100-1 is not found in the Device Table. Accordingly, control passes to subroutine 11, which peruses the MAR Table of LEC 103-4. It either finds an entry in its MAR Table for device 100-1, or it does not. Further, if an entry is found for device 100-1 in the MAR Table of LEC 103-4, it is either correct or incorrect.

When no entry is found in the MAR Table of LEC 103-4, message M3 is sent to the LES. The LES returns message M6 (which includes an entry that corresponds to the correct binding of device 100-1 to LEC 103-2), subroutine 14 in LEC 103-4 updates its MAR Table, message M5 is sent (which is also marked 115), subroutine 14 in LEC 103-2 updates its MAR Table, and communication is established with subroutines 12 and lines 20 and 21, as before.

When an entry is found in the MAR Table of LEC 103-4, the LEC proceeds to send message M5 to the LEC identified in the entry retrieved from the MAR Table. When that entry is correct, communication is established as described above. This is shown by message M5 that is also labeled 105, respectively in FIG. 8.

The case when the entry in LEC 103-4 is incorrect is depicted in FIG. 9. Since an address is found and the LEC is unaware that the address is incorrect, message M5 is sent out, and message M5 is sent to the incorrect LEC; illustratively, to LEC 103-3. At LEC 103-3, subroutine 14 updates the MAR Table with the binding between device 100-4 and LEC 103-4, and control passes to address resolution subroutine 12 of LEC 103-3. Subroutine 12 determines that device 100-1 is not found in LEC 103-3 and, consequently, sends a "not here" message M13 to the sending LEC, which in this case is LEC 103-4.

When message M13 is received at LEC 103-4, the LEC concludes that the entry in its MAR Table that related to device 100-1 is incorrect. Consequently, subroutine 17 is activated (effectively a portion of subroutine 11), which sends message M3 to the LES. The LES returns message M6 with the correct binding information. This information is used by subroutine 14 in LEC 103-4 to update its MAR Table, message M5 is sent again, subroutine 14 in LEC 103-2 updates its MAR Table, and this time communication is established as shown via lines 20 and 21.

In the embodiment described above, the LECs employ an address resolution subroutine 12 that, when it fails to find the destination MAC address in the Devices Table, sends the aforementioned "not here" message M13. The LEC that caused this message to be sent then turns to the LES for the needed information. In another embodiment of this invention, the resolution subroutine 12 produces message M13 that includes a suggestion in its response. Rather than sending merely a "not here" message, message M13 includes the binding information for device 100-1 that is found in its MAR Table. In the case at hand, LEC 103-3 would suggest LEC 103-2. LEC 103-4 then attempts to establish connection through the suggested LEC 103-2 and, in this case, this attempt is successful.

If the suggested binding is incorrect, LEC 103-4 receives another suggestion and, it can be shown that, eventually, LEC 103-4 would obtain a correct binding. This approach relieves the load on the LES, but it potentially results in a slower response.

In a still another embodiment, subroutine 12 that does not find the sought device in its LEC's Devices Table, forwards the received M5 message to the LEC at which its MAR table believes device 100-1 to be. Even if that information were incorrect, again the effective daisy chaining would eventually bring the forwarded M5 message to the correct LEC. When that happens, the "update MAR Table" subroutine 14 of the destination LEC must send an M6 message to the "update MAR Table" subroutine 14 of the source LEC to update that MAR table.

This scenario shows how the address of devices that move from LAN to LAN are resolved dynamically by the scheme devised in this invention.

Figure 10:
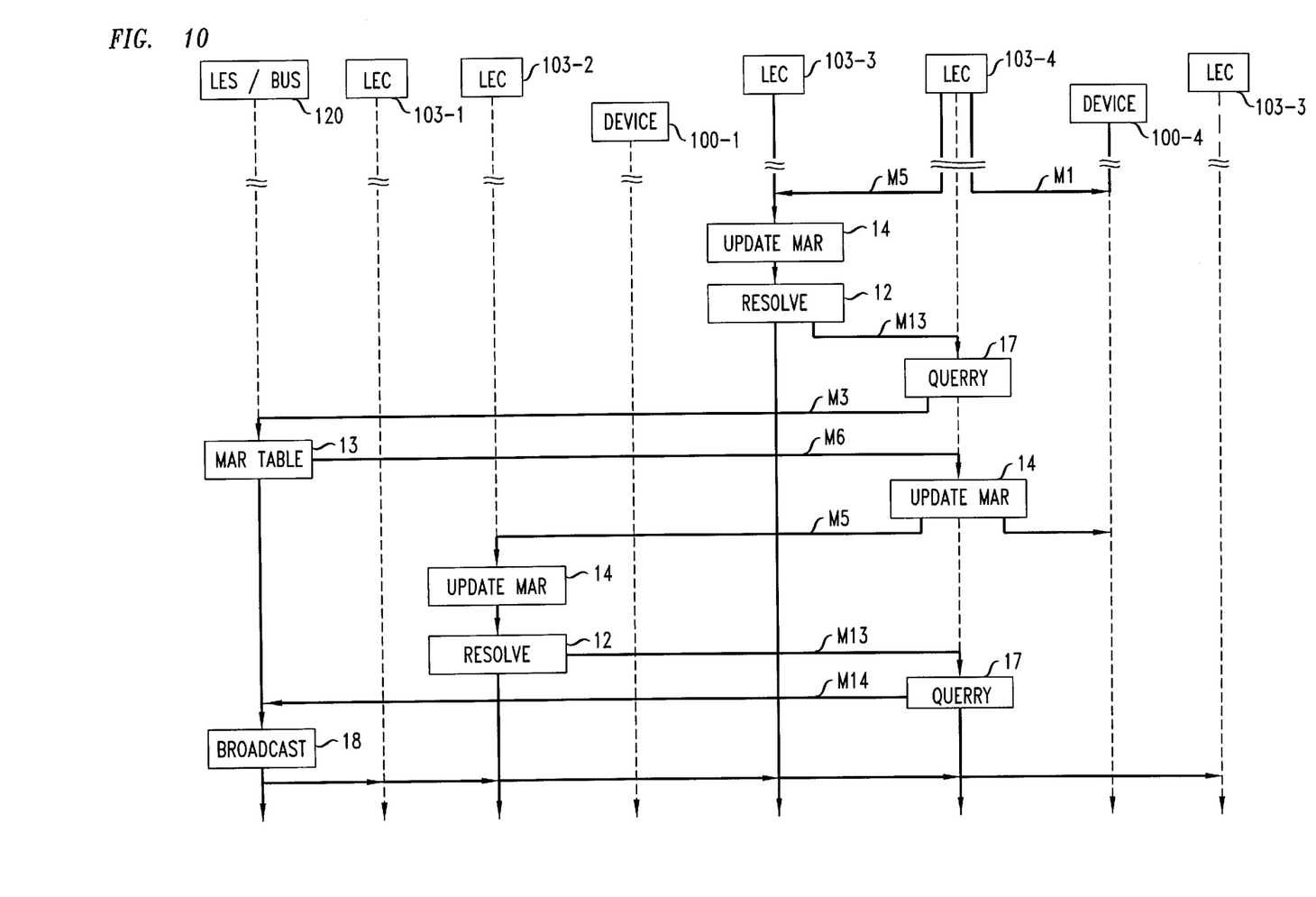
FIG. 10 presents a protocol for a situation that identical to that of FIGS. 8 and 9, except that the new location of the device that moved in not known to the LES.

Scenario 6—FIG. 10

In this scenario, device 100-1 moves from LAN 102-1 to LAN 102-2, but remains inactive. Sometime later, device 100-4 wishes to be connected to device 100-1. In a sense, this scenario is the same as scenario 2, except that since device 100-1 had previously interacted in the network, a number of entities know of its identity and believe to know its whereabouts. In another sense, this scenario is the same as scenario 5 in that a number of entities know of the identity of device 100-1, but none know the correct whereabouts of device 100-1.

More specifically, when in the scenario 5 embodiment (FIG. 9) LEC 103-4 sends message M3 to the LES in response to the first "not here" message M11 and received message M6, it doesn't know it by the information provided by message M6 is incorrect. Consequently, when a new message M5 is sent out due to initiation of message M1, LEC 103-4 receives a second "not here" message M11. Having received a second "not here" message, subroutine 17 determines that the LES has incorrect information, and sends a message M14 to the LES. In response to message M14, subroutine 18 in the LES broadcasts message M8 and proceed as described in connection with FIG. 4 and FIG. 5.

While the above discloses a methodology for allowing devices the move about from LAN to LAN, and even across ELANs, without undue administrative burden, further enhancements can be had by, nevertheless, accepting the concept of a "home LEC" of a device, and a device can also choose which one will be its home LEC at the time of subscription to service. The home LEC of the device would be the LEC to which the device is most frequently connected, and when connected at the home LEC, some service features may be provided that are not provided when the device is in any other LEC. To achieve this capability, as explained earlier, the LES maintains a table that specifies the home LEC of each device. In addition to the description provided earlier, this table can be updated in a variety of methods including, for example, employing the LEC that first introduced the device to the LES as the home LEC. Correspondingly, each LEC maintains a table of devices for which it serves as the home LEC.

In such an embodiment, it is advantageous for the home LEC to be always aware of the whereabouts of its devices. This is achieved by the LES always informing the relevant home LEC whenever the LES MAR Table is updated. Since, presumably, a device is at its home LEC most of the time, most of the other LECs would have that address in their MAR Table. When they send an M5 message to the home LEC but the device is not there, the home LEC's suggestion (message M13) would be a valid suggestion. If a flag is set in each MAR Table entry to indicate that the entry corresponds to the device's home LEC, then a source LEC is assured that either connection will be established directly with the destination device, or after one M13 message.

The following summarizes the messages discussed above:

M1: From a device, to its LEC, specifying its own MAC address and the MAC address of a destination device along with the payload information of the end user.

M3: A query message from a LEC to the LES, providing the MAC address of a destination device and requesting the address of a LEC that has that destination device.

M5: From a LEC of a source device to the LEC of a destination device, requesting that the appropriate device be contacted and a communication path established.

M6: A response message from the LES to a LEC that sent an M3 message.

M8: A broadcast message from a LES/BUS to the LES entities of other ELANs, asking for a LEC address of a sought destination device.

M9: A message from a LES in response to an M8 broadcast message.

M11: A message from a device to its LEC responsive to message M10.

M12: A message from the LES to a LEC, directing the LEC to update its MAR table. This message is the same as message M6, except that it is not directed to a LEC that sent in a query message M3

M13: A message to a LEC informing the LEC that the device sought is not present in the LAN associated with the message-sending LEC.

M14: From a LEC to a LES, informing the latter that the information it has in its MAR Table is incorrect.

It should be understood that the above disclosed one embodiment that comports with the principles of this invention and that various modifications can be made without departing from the spirit and scope of the invention, which is defined in the following claims. By way of example, the Devices Table and the MAR Table within a LEC can be combined.

We claim:

1. A Wide Area Network (WAN) arrangement including a connection fabric and terminal points for accessing said connection fabric, where said terminal points are adapted for connecting LAN Emulation Clients (LECs), where a LEC of said LECs is coupled to an associated LAN that allows at least one device coupled to said LAN to communicate with to other devices coupled to said LAN or to communicate via said connection fabric to a device coupled to a LAN associated with another LEC, said WAN further comprising:

a LAN Emulation Server (LES) with
memory that maintains binding information about devices coupled to LANs of LECs, where the binding information about a device associates a unique address that identifies said device with an address of the LEC that is associated with the LAN to which said device is coupled, and
a controller for updating said binding information of said device in response to a signal sent by a LEC whenever the LEC recognizes that said device coupled to its LAN is not known to the LEC to be coupled to its LAN.

2. The arrangement of claim 1 where said WAN comprises an ATM network, and said address of a LEC is an ATM address by which said WAN can communicate with said LEC.

3. The arrangement of claim 1 where said LES further comprises a module that associates device addresses with preassigned LEC addresses.

4. The arrangement of claim 1 where said controller responds to a request for binding information of a device by sending the associated LEC address.

5. The arrangement of claim 4 further including broadcast means that said controller activates when said controller cannot send said associated LEC address in response to said request, and in response to activation said broadcast means
sends a broadcast message to one or more other LES entities of said arrangement, requesting binding information about said device,
receives a response from one of said other LES entities,
installs binding information received from said one of said other LES entities in said memory, and
forwards the installed binding information to a LEC that sent said request.

6. The arrangement of claim 4 further including broadcast means that said controller activates when said controller cannot send said associated LEC address in response to said request, and in response to activation said broadcast means
sends a broadcast message to LECs associated with said LES, requesting binding information about said device,
receives a response from one of said LECs,
installs binding information received from said one of said LECs in said memory,and
forwards the installed binding information to a LEC that sent said request.

7. A LAN Emulation Client (LEC) including means for communicating with a LAN Emulation Server (LES), and means for communicating through an associated LAN with devices connected to a LAN, comprising:
  a memory that stores a set of bindings, each of which associates a MAC address of a device with an address of the LEC that communicates directly with a LAN to which said device is connected; and
  a controller that interacts with said devices that are connected to said associated LAN, with controllers of other LECs, and with said LES, where said set of bindings includes the bindings of less than all of the devices connected to said associated LAN.

8. The LEC of claim 7 where said memory also includes collection of entries that identify devices that are coupled to said associated LAN.

9. The LEC of claim 8 where said collection of entries also identifies those devices that consider said LEC as the home LEC.

10. The LEC of claim 9 where said controller provides a first set of capabilities to be offered to devices coupled to said associated LAN that consider said LEC as the home LEC, and a second set of capabilities to devices coupled to said associated LAN that do not consider said LEC as the home LEC.

11. The LEC of claim 8 where said memory includes a second collection of entries that identify devices that consider said LEC as the home LEC.

12. A LAN Emulation Client (LEC) including means for communicating with a LAN Emulation Server (LES), and means for communicating through an associated LAN with devices connected to a LAN, comprising:
  a memory that stores a set of bindings, each of which associates a MAC address of a device with an address of the LEC that communicates directly with a LAN to which said device is connected; and
  a controller that interacts with said devices that are connected to said associated LAN, with controllers of other LECs, and with said LES, where said controller, in response to a request by a device connected to said associated LAN to establish communication with another device, ascertains whether said another device is coupled to said associated LAN, and when it is, informs the device making the request that intra-LAN communication can proceed.

13. A LAN Emulation Client (LEC) including means for communicating with a LAN Emulation Server (LES), and means for communicating through an associated LAN with devices connected to a LAN, comprising:
  a memory that stores a set of bindings, each of which associates a MAC address of a device with an address of the LEC that communicates directly with a LAN to which said device is connected; and
  a controller that interacts with said devices that are connected to said associated LAN, with controllers of other LECs, and with said LES, where said controller, in response to a request by a device connected to said associated LAN to establish communication with another device, ascertains whether said another device is coupled to said associated LAN, and when it is not, peruses said set of bindings that are stored in said memory, ascertains a LEC address that is associated with said another device, which constitutes a destination LEC address, and sends a message to said destination LEC.

14. The LEC of claim 13 where, when said LEC is unable to ascertain a LEC address that is associated with said another device, sends a message to said LES requesting said LES to provide said destination LEC address.

15. The LEC of claim 14 where said controller receives said destination LEC address, updates said set of bindings stored in said memory, and proceeds to send said message to said destination LEC.

16. A LAN Emulation Client (LEC) including means for communicating with a LAN Emulation Server (LES), and means for communicating through an associated LAN with devices connected to a LAN, comprising:
  a memory that stores a set of bindings, each of which associates a MAC address of a device with an address of the LEC that communicates directly with a LAN to which said device is connected; and
  a controller that interacts with said devices that are connected to said associated LAN, with controllers of other LECs, and with said LES, where said controller accepts a message from another LEC seeking establishment of a communication with a destination device, passes a message to said destination device when said destination device is found to be coupled to its associated LAN, and returns a device-not-here message when said destination device is not found to be coupled to its associated LAN.

17. The LEC of claim 16 where said controller, upon finding that said destination device is not found to be coupled to its associated LAN, includes in said device-not-here message a LEC address for said destination device that is found in said set of bindings stored in said memory.

18. In a Wide Area Network (WAN) arrangement including a connection fabric with terminal points for accessing said connection fabric, and LAN Emulation Clients (LECs) connected to said terminal points, where a LEC includes a LAN that allows at least one device coupled to said LAN to communicate with to other devices coupled to said LAN or to communicate via said connection fabric to a device coupled to a LAN of another LEC, a method comprising:
  a first step of a first device connected to a first LAN of a first LEC, sending a message to said first LEC, seeking the establishment of communication with a second device;
  a second step, of said first LEC searching a local memory for information about said first device;
  a third step, when a record is not found in the course of said searching of said local memory that reflects the fact that said first device is coupled to said first LAN, of said first LEC sending a first message to a LES, informing said LES of a binding between said first device and said first LEC;
  a fourth step, of said first LEC searching a local memory for information about said second device;
  a fifth step, when said second device is found to be coupled to said first LAN in the course of said searching of said local memory, of said first LEC sending a second message to said first device, informing said first device that intra-LAN communication is to be established with said second device;
  a sixth step, when said second device is not found to be coupled to said first LAN in the course of said searching of said local memory but is found to be coupled to a LAN of a second LEC, of sending a third message to said second LEC requesting said second LEC to inform said second device that inter-LAN, intra-WAN, communication is to be established with said second device; and
  a seventh step, when said second device is not found in the course of said searching of said local memory, of sending a fourth message to said LES, requesting said LES to inform said first LEC of a LEC address of said second LEC that has said second device connected to a LAN that is associated with said second LEC.

19. The method of claim 18 further comprising an eighth step of receiving a response from said LES to said fourth message and updating biding information in said local memory that associates said address of said second device with said LEC address of said second LEC.

20. The method of claim 18 further comprising:

a ninth step, when in response to said third message said first LEC receives a device-not-here message from said second LEC, of sending said fourth message to said LES, requesting said LES to inform said first LEC of a LEC address of another LEC that has said second device connected to a LAN that is associated with said another LEC.

21. The method of claim 20 further comprising:

a tenth step, when in response to said third message, said first LEC receives a device-not-here message from said second LEC that includes an identity of a third LEC where said second device may be found, of updating biding information in said local memory that associates said address of said second device with said LEC address of said third LEC.

22. The method of claim 20 further comprising:

an eleventh step, when in response to said third message, said first LEC receives a device-not-here message from said second LEC that includes an identity of a third LEC where said second device may be found, of sending said third message to said third LEC; and a twelfth step of updating biding information in said local memory that associates said address of said second device with said LEC address of said third LEC when communication can be established between said first device in said first LEC and said second device in said third LEC.

23. The method of claim 22 further comprising:

a thirteenth step, when in response to said tenth step said first LEC receives a device-not-here message from said third LEC that includes an identity of a fourth LEC where said second device may be found, of sending said third message to said fourth LEC.

24. The method of claim 22 further comprising:

a fourteenth step, when in response to said tenth step said first LEC receives a device-not-here message from said third LEC, of sending said fourth message to said LES.

* * * * *